US010782118B2

(12) United States Patent
Hillebrand (10) Patent No.: US 10,782,118 B2
(45) Date of Patent: *Sep. 22, 2020

(54) LASER SCANNER WITH PHOTOGRAMMETRY SHADOW FILLING (71) Applicant: FARO Technologies, Inc., Lake Mary, FL (US)

(72) Inventor: Gerrit Hillebrand, Waiblingen (DE)

(73) Assignee: FARO TECHNOLOGIES, INC., Lake Mary, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/271,166

(22) Filed: Feb. 8, 2019

(65) Prior Publication Data
US 2019/0257642 A1 Aug. 22, 2019

Related U.S. Application Data (60) Provisional application No. 62/633,271, filed on Feb. 21, 2018.

(51) Int. Cl.
G01B 11/00 (2006.01)
G01B 11/26 (2006.01)
G01C 11/02 (2006.01)
G01S 7/481 (2006.01)
G01S 17/08 (2006.01)
(Continued)

(52) U.S. Cl.
CPC ............ G01B 11/002 (2013.01); G01B 11/26 (2013.01); G01C 11/025 (2013.01); G01S 7/4817 (2013.01); G01S 17/08 (2013.01); G01S 17/86 (2020.01); G01S 17/89 (2013.01); G01C 2011/36 (2013.01)

(58) Field of Classification Search
CPC ........ G01S 17/08; G01S 17/89; G01S 7/4817; G01S 17/023; G01S 17/86; G01B 11/26; G01B 11/002; G01C 11/025; G01C 2011/36
USPC ..... 356/600–640, 237.1–237.6, 239.1–239.8
See application file for complete search history.

(56) References Cited

U.S. PATENT DOCUMENTS 7,193,690 B2 3/2007 Ossig et al.
7,733,544 B2 6/2010 Becker et al.
(Continued)

FOREIGN PATENT DOCUMENTS

| EP | 2998778 A1 | 3/2016 |
| EP | 3182065 A1 | 6/2017 |
| WO | 2016089430 A1 | 6/2016 |

OTHER PUBLICATIONS

Extended European Search Report for Application No. 19158206.3 dated Jul. 24, 2019; (9 pgs).

Primary Examiner — Tri T Ton
(74) Attorney, Agent, or Firm — Cantor Colburn LLP (57) ABSTRACT A three-dimensional (3D) measuring device and a method are provided. The measuring device includes a processor system including a scanner controller. A housing is provided with a 3D scanner that is coupled to the processor system. The scanner determining a first distance to a first object point and cooperating with the processor system to determine 3D coordinates of the first object point. The measuring device further includes a photogrammetry camera coupled to the housing, the photogrammetry camera having a lens and an image sensor that define a field of view. The photogrammetry camera is arranged to position the field of view at least partially in a shadow area, the shadow area being outside of the scan area.

22 Claims, 10 Drawing Sheets (51) Int. Cl.
  *G01S 17/89* (2020.01)
  *G01S 17/86* (2020.01)
  *G01C 11/36* (2006.01)

(56) References Cited

U.S. PATENT DOCUMENTS

| | | |
|---|---|---|
| 7,869,005 B2 | 1/2011 | Ossig et al. |
| 8,064,046 B2 | 11/2011 | Ossig et al. |
| 8,699,007 B2 | 4/2014 | Becker et al. |
| 8,699,036 B2 | 4/2014 | Ditte et al. |
| 8,705,012 B2 | 4/2014 | Greiner et al. |
| 8,730,477 B2 | 5/2014 | Ruhland et al. |
| 8,705,016 B2 | 8/2014 | Schumann et al. |
| 8,830,485 B2 | 9/2014 | Woloschyn |
| 8,875,409 B2 | 11/2014 | Kretschmer et al. |
| 8,896,819 B2 | 11/2014 | Schumann et al. |
| 9,074,878 B2 | 7/2015 | Steffey et al. |
| 9,113,023 B2 | 8/2015 | Bridges et al. |
| 9,134,339 B2 | 9/2015 | Becker et al. |
| 9,210,288 B2 | 12/2015 | Bridges et al. |
| RE45,854 E | 1/2016 | Gittinger et al. |
| 9,279,662 B2 | 3/2016 | Steffey et al. |
| 9,417,056 B2 | 8/2016 | Neundorf et al. |
| 9,417,316 B2 | 8/2016 | Schumann et al. |
| 9,513,107 B2 | 12/2016 | Zweigle et al. |
| 9,529,083 B2 | 12/2016 | Bridges et al. |
| 9,551,575 B2 | 1/2017 | Bridges et al. |
| 9,645,240 B1 | 5/2017 | Ossig et al. |
| 9,684,078 B2 | 6/2017 | Ossig et al. |
| 9,689,972 B2 | 6/2017 | Becker et al. |
| 9,746,311 B2 | 8/2017 | Bartmann et al. |
| 9,762,883 B2 | 9/2017 | Vollrath et al. |
| 10,175,360 B2 | 1/2019 | Zweigle et al. |
| 2012/0069325 A1 | 3/2012 | Schumann et al. |
| 2012/0069352 A1 | 3/2012 | Ossig et al. |
| 2012/0070077 A1 | 3/2012 | Ossig et al. |
| 2012/0140244 A1 | 6/2012 | Gittinger et al. |
| 2012/0188559 A1 | 7/2012 | Becker et al. |
| 2013/0201487 A1 | 8/2013 | Ossig et al. |
| 2014/0300906 A1 | 10/2014 | Becker et al. |
| 2017/0184708 A1 | 6/2017 | Woloschyn et al. |
| 2017/0184710 A1 | 6/2017 | Reinhard et al. |
| 2017/0184711 A1 | 6/2017 | Becker |

LASER SCANNER WITH PHOTOGRAMMETRY SHADOW FILLING

CROSS-REFERENCE TO RELATED APPLICATION

The present application claims the benefit of U.S. Provisional Application Ser. No. 62/633,271 filed on Feb. 21, 2018, the contents of which are incorporated by reference herein

BACKGROUND

The subject matter disclosed herein relates to use of a 3D laser scanner time-of-flight (TOF) coordinate measurement device. A 3D laser scanner of this type steers a beam of light to a non-cooperative target such as a diffusely scattering surface of an object. A distance meter in the device measures a distance to the object, and angular encoders measure the angles of rotation of two axles in the device. The measured distance and two angles enable a processor in the device to determine the 3D coordinates of the target.

A TOF laser scanner is a scanner in which the distance to a target point is determined based on the speed of light in air between the scanner and a target point. Laser scanners are typically used for scanning closed or open spaces such as interior areas of buildings, industrial installations and tunnels. They may be used, for example, in industrial applications and accident reconstruction applications. A laser scanner optically scans and measures objects in a volume around the scanner through the acquisition of data points representing object surfaces within the volume. Such data points are obtained by transmitting a beam of light onto the objects and collecting the reflected or scattered light to determine the distance, two-angles (i.e., an azimuth and a zenith angle), and optionally a gray-scale value. This raw scan data is collected, stored and sent to a processor or processors to generate a 3D image representing the scanned area or object.

Generating an image requires at least three values for each data point. These three values may include the distance and two angles, or may be transformed values, such as the x, y, z coordinates. In an embodiment, an image is also based on a fourth gray-scale value, which is a value related to irradiance of scattered light returning to the scanner.

Most TOF scanners direct the beam of light within the measurement volume by steering the light with a beam steering mechanism. The beam steering mechanism includes a first motor that steers the beam of light about a first axis by a first angle that is measured by a first angular encoder (or other angle transducer). The beam steering mechanism also includes a second motor that steers the beam of light about a second axis by a second angle that is measured by a second angular encoder (or other angle transducer).

Many contemporary laser scanners include a camera mounted on the laser scanner for gathering camera digital images of the environment and for presenting the camera digital images to an operator of the laser scanner. By viewing the camera images, the operator of the scanner can determine the field of view of the measured volume and adjust settings on the laser scanner to measure over a larger or smaller region of space. In addition, the camera digital images may be transmitted to a processor to add color to the scanner image. To generate a color scanner image, at least three positional coordinates (such as x, y, z) and three color values (such as red, green, blue "RGB") are collected for each data point.

A 3D image of a scene may require multiple scans from different registration positions. The overlapping scans are registered in a joint coordinate system. Such registration is performed by matching targets in overlapping regions of the multiple scans. The targets may be artificial targets such as spheres or checkerboards or they may be natural features such as corners or edges of walls. Some registration procedures involve relatively time-consuming manual procedures such as identifying by a user each target and matching the targets obtained by the scanner in each of the different registration positions. Some registration procedures also require establishing an external "control network" of registration targets measured by an external device such as a total station.

It is difficult to remove the need for a user to carry out the manual registration steps as described above. In a typical case, only 30% of 3D scans can be automatically registered to scans taken from other registration positions. Today such registration is seldom carried out at the site of the 3D measurement but instead in an office following the scanning procedure. In a typical case, a project requiring a week of scanning requires two to five days to manually register the multiple scans. This adds to the cost of the scanning project. Furthermore, the manual registration process sometimes reveals that the overlap between adjacent scans was insufficient to provide proper registration. In other cases, the manual registration process may reveal that certain sections of the scanning environment have been omitted. When such problems occur, the operator must return to the site to obtain additional scans. In some cases, it is not possible to return to a site. A building that was available for scanning at one time may be impossible to access at a later time. A forensics scene of an automobile accident or a homicide is often not available for taking of scans for more than a short time after the incident.

Accordingly, while existing 3D scanners are suitable for their intended purposes, what is needed is a 3D scanner having certain features of embodiments of the present invention.

BRIEF DESCRIPTION

According to one embodiment, a three-dimensional (3D) measuring device is provided. The 3D measuring device includes a processor system including at least one of a 3D scanner controller. A housing is provided with a 3D scanner disposed within the housing and operably coupled to the processor system. The 3D scanner having a light source, a beam steering unit, a first angle measuring device, a second angle measuring device, and a light receiver, the beam steering unit cooperating with the light source and light receiver to define a scan area. The light source and the light receiver are configured to cooperate with the processor system to determine a first distance to a first object point based at least in part on a transmitting of a light by the light source and a receiving of a reflected light by the light receiver. The 3D scanner is configured to cooperate with the processor system to determine 3D coordinates of the first object point based at least in part on the first distance, a first angle of rotation and a second angle of rotation. The 3D measuring device further includes a photogrammetry camera operably coupled to the housing, the photogrammetry camera having a lens and an image sensor that define a field of view, the photogrammetry camera being oriented to position the field of view at least partially in a shadow area, the shadow area being outside of the scan area.

In addition to one or more of the features described herein, or as an alternative, further embodiments of the device may include the field of view of the photogrammetric camera being further at least partially in the scan area. In addition to one or more of the features described herein, or as an alternative, further embodiments of the device may include the processor system is responsive to executable nontransitory computer instructions which when executed by the processor system is operable to: cause the 3D scanner to rotate the housing about a first axis and the beam steering unit to rotate about a second axis, the second axis being perpendicular to the first axis; cause the 3D scanner to cooperate with the processor system to determine 3D coordinates of a collection of points on the object surface while the 3D scanner is rotated; cause the photogrammetry camera to acquire at least two images of the shadow area while the 3D scanner is rotated; and determining with the processor system at least one 3D coordinate based at least in part on the two images.

In addition to one or more of the features described herein, or as an alternative, further embodiments of the device may include the first angle measuring device measuring a first angle about the first axis and the second angle measuring device measuring a second angle about the second axis. In addition to one or more of the features described herein, or as an alternative, further embodiments of the device may include determining of the at least one 3D coordinate further based at least in part on the first angle and the second angle. In addition to one or more of the features described herein, or as an alternative, further embodiments of the device may include the processor system is responsive to executable nontransitory computer instructions which when executed by the processor system is operable to combine the at least one 3D coordinate with the 3D coordinates of the first object point to define a point cloud.

In addition to one or more of the features described herein, or as an alternative, further embodiments of the device may include the photogrammetry camera is offset from the first axis. In addition to one or more of the features described herein, or as an alternative, further embodiments of the device may include the beam steering unit has a mirror configured to rotate about the second axis and a carriage that holds the mirror configured to rotate about the first axis, the rotation about the second axis being driven by a second motor and the rotation about the first axis being driven by a first motor.

According to another embodiment, a method for measuring and registering three-dimensional (3D) coordinates is provided. The method comprising: rotating a 3D scanner about a first axis, the 3D scanner having a light source, a light receiver and a photogrammetry camera; emitting a plurality of light beams from the light source and receiving with the light receiver a plurality of reflected light beams from an object surface within a scan area, the direction of each of the plurality of light beams being determined by a beam steering unit; determining, with a processor system, 3D coordinates of a first collection of points on the object surface within a scan area based at least in part on the plurality of light beams and the plurality of reflected light beams; acquiring at least two images of within the field of view of the photogrammetry camera as the 3D scanner is rotated about the first axis, the field of view of each of the photogrammetry camera being at least partially within a shadow area, the shadow area being outside of the scan area; determining, with the processor system, 3D coordinates of a second collection of points on the object surface based at least in part on the at least two images; merging the 3D coordinates of the first collection of points and the 3D coordinates of the second collection of points to define a point cloud; and storing the point cloud.

In addition to one or more of the features described herein, or as an alternative, further embodiments of the method may include the field of view of the photogrammetry camera being further at least partly within the scan area. In addition to one or more of the features described herein, or as an alternative, further embodiments of the method may include the step of rotating the 3D scanner includes rotating the 3D scanner about the first axis and the beam steering unit about a second axis, the second axis being perpendicular to the first axis.

In addition to one or more of the features described herein, or as an alternative, further embodiments of the method may include measuring rotation about the first axis with a first angle measuring device and measuring rotation of the beam steering unit with a second angle measuring device. In addition to one or more of the features described herein, or as an alternative, further embodiments of the method may include the 3D coordinates of the first collection of points is further based at least in part on a measurement by the first angle measuring device and a measurement by the second angle measuring device.

In addition to one or more of the features described herein, or as an alternative, further embodiments of the method may include the determining of the 3D coordinates of the second collection of points is further based at least in part on a first measurement by the first angle measuring device when a first image of the at least two images is acquired and a second measurement by the first angle measuring device when a second image of the at least two images is acquired. In addition to one or more of the features described herein, or as an alternative, further embodiments of the method may include the photogrammetry camera is offset from the first axis.

According to still another embodiment, a three-dimensional measuring system is provided. The 3D measuring system having a housing that is rotatable about a first axis. A light source is disposed within the housing and operable to emit light beams. A beam steering unit is coupled to the housing and disposed to direct the emitted light beams onto an object surface within a scan area in the environment. A light receiver is disposed within the housing to receive light reflected from the object surface through the beam steering unit. A photogrammetry camera is operably coupled to the housing, the photogrammetry camera having a lens and an image sensor that define a field of view, the photogrammetry camera being oriented to acquire an image within the field of view that is at least partially within a shadow area and at least partially within the scan area, the shadow area being separate from the scan area. A processor system is operably coupled to the light source, the beam steering unit, the light receiver and the photogrammetry camera, the processor system being responsive to nontransitory executable computer instructions to determine 3D coordinates of a first collection of points on the object surface based at least in part on the emitting of the light beams and the receiving by the light receiver of the reflected light, and to determine 3D coordinates of a second collection of points in the shadow area based on at least two images acquired by the photogrammetry camera.

In addition to one or more of the features described herein, or as an alternative, further embodiments of the system may include the processor system being responsive to executable nontransitory computer instructions which when executed by the processor system is operable to: cause the housing to rotate about a first axis and the beam steering unit to rotate about a second axis, the second axis being perpendicular to the first axis; cause photogrammetry camera to acquire a first image of the at least two images at a first rotational position about the first axis and the second image of the at least two image at a second rotational position about the first axis; and determine the 3D coordinates of the second collection of points based at least in part on the first rotational position and the second rotational position.

In addition to one or more of the features described herein, or as an alternative, further embodiments of the system may include the processor system being responsive to executable nontransitory computer instructions which when executed by the processor system is operable to combine the 3D coordinates of the first collection of points and the 3D coordinates of the second collection of points to define a point cloud. In addition to one or more of the features described herein, or as an alternative, further embodiments of the system may include the photogrammetry camera is offset from the first axis.

In addition to one or more of the features described herein, or as an alternative, further embodiments of the system may include the beam steering unit having a mirror operable to rotate about a second axis, the second axis being perpendicular to the first axis, the mirror being disposed to reflect the emitted light beams and the reflected light beams. In addition to one or more of the features described herein, or as an alternative, further embodiments of the system may include a first motor coupled to rotate the housing about the first axis, and a second motor coupled to rotate the mirror about the second axis.

In addition to one or more of the features described herein, or as an alternative, further embodiments of the system may include a first angle measuring device operably coupled to measure the rotational position of the housing about the first axis; a second angle measuring device operably coupled to measure the rotational position of the mirror about the second axis; and wherein the 3D coordinates of the first collection of points are based at least in part on measurements by the first angle measuring device and the second angle measuring device.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION

The present invention relates to a 3D measuring device having a 3D scanner and at least one photogrammetry camera. Embodiments of the invention provide advantages acquiring three-dimensional (3D) coordinates of an area of the environment that is shadowed from the 3D camera using a photogrammetry camera. Embodiments of the invention provide advantages in acquiring 3D coordinates of a floor area below the 3D scanner using a photogrammetry camera.

Figure 1:
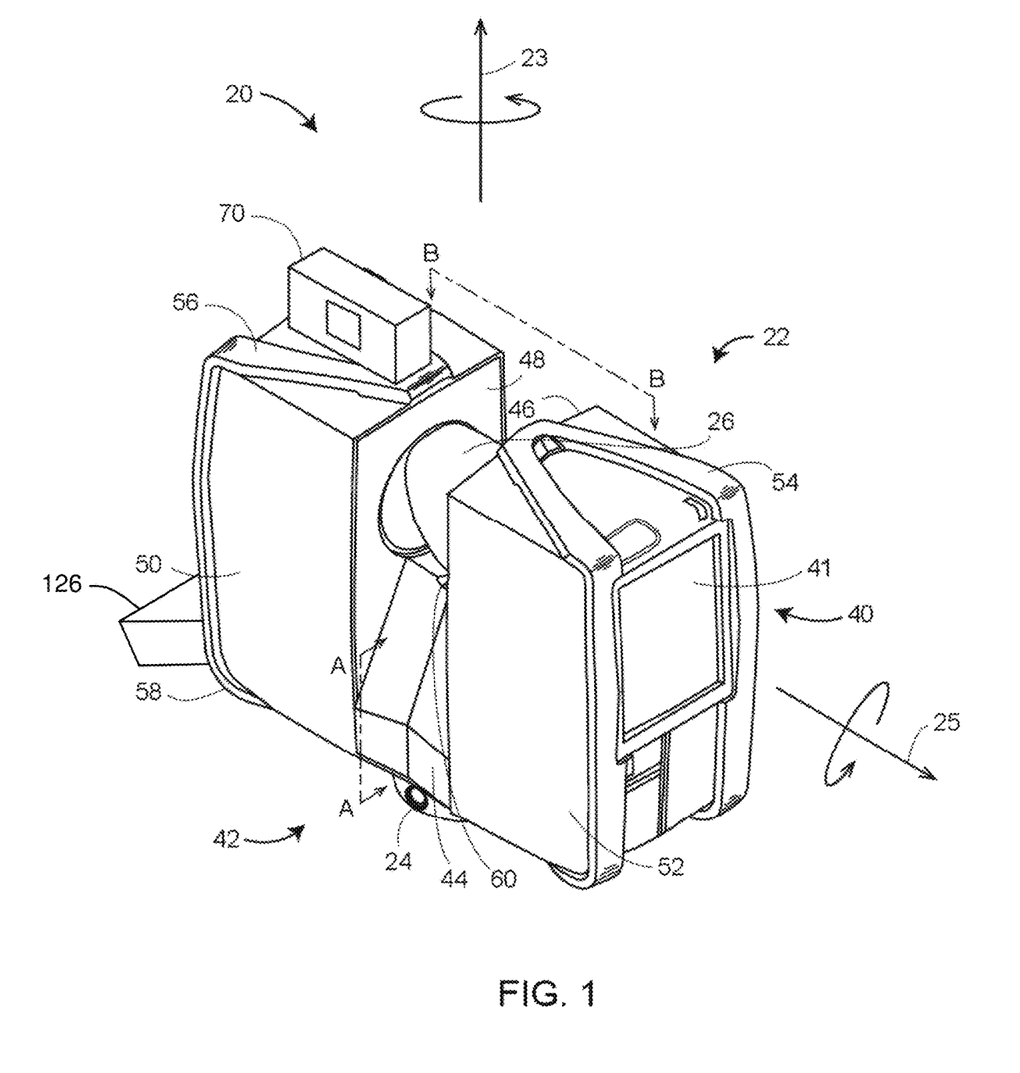
FIG. 1 is a perspective view of a laser scanner in accordance with an embodiment of the invention.
Figure 2:
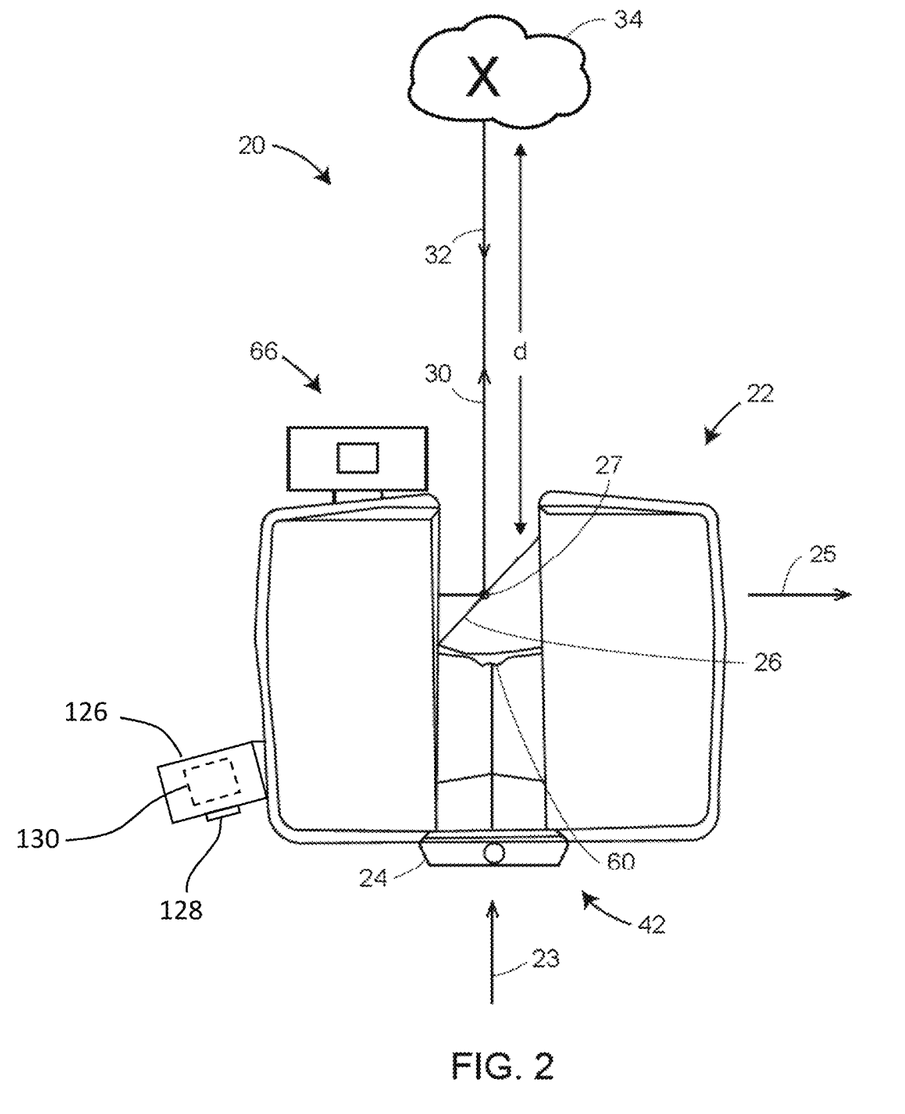
FIG. 2 is a side view of the laser scanner illustrating a method of measurement according to an embodiment.
Figure 3:
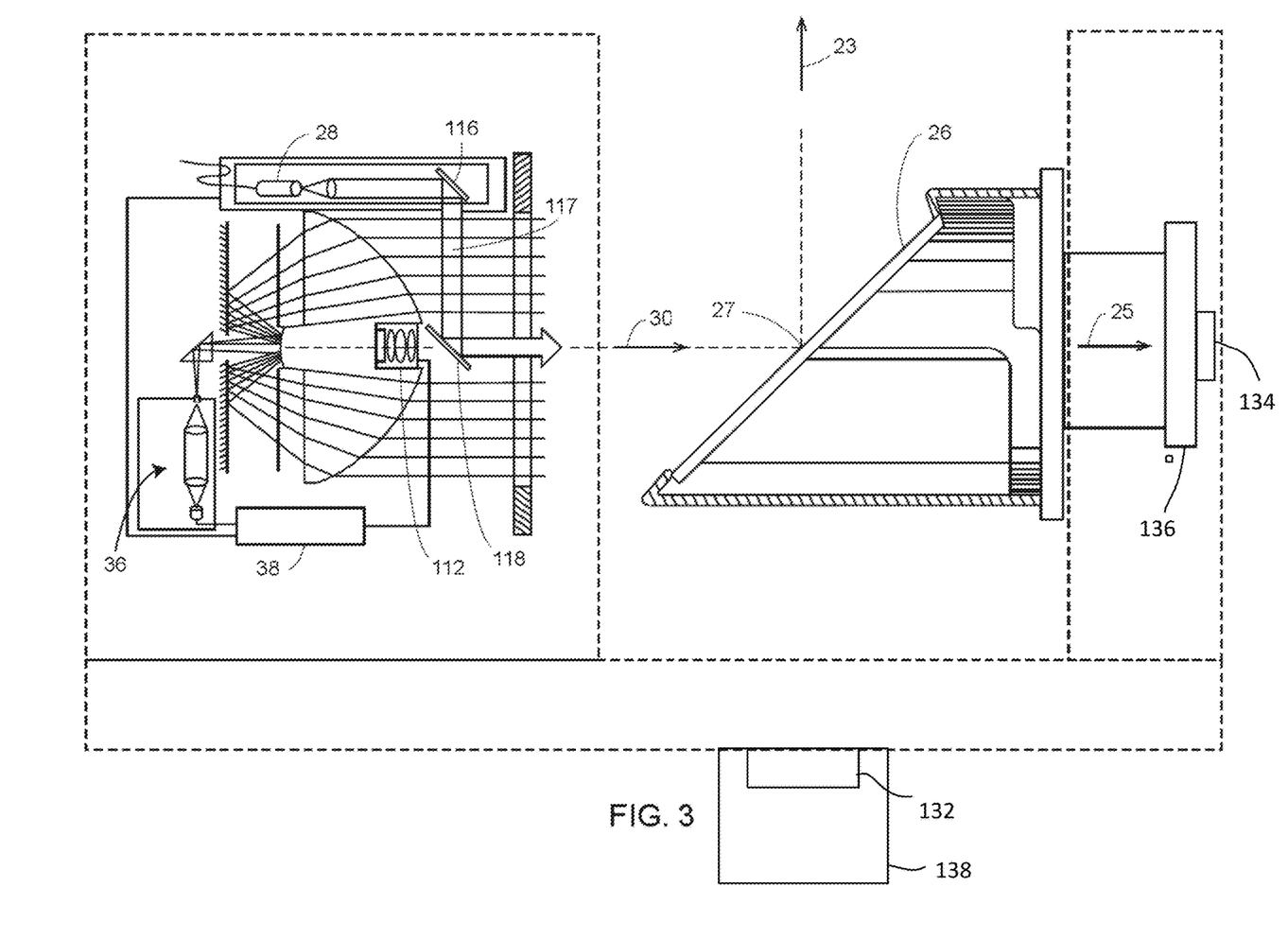
FIG. 3 is a schematic illustration of the optical, mechanical, and electrical components of the laser scanner according to an embodiment.

Referring now to FIGS. 1-3, a laser scanner 20 is shown for optically scanning and measuring the environment surrounding the laser scanner 20. The laser scanner 20 has a measuring head 22 and a base 24. The measuring head 22 is mounted on the base 24 such that the laser scanner 20 may be rotated about a vertical axis 23. In one embodiment, the measuring head 22 includes a gimbal point 27 that is a center of rotation about the vertical axis 23 and a horizontal axis 25. The measuring head 22 has a rotary mirror 26, which may be rotated about the horizontal axis 25. The rotation about the vertical axis may be about the center of the base 24. The terms vertical axis and horizontal axis refer to the scanner in its normal upright position. It is possible to operate a 3D coordinate measurement device on its side or upside down, and so to avoid confusion, the terms azimuth axis and zenith axis may be substituted for the terms vertical axis and horizontal axis, respectively. The term pan axis or standing axis may also be used as an alternative to vertical axis.

The measuring head 22 is further provided with an electromagnetic radiation emitter, such as light emitter 28, for example, that emits an emitted light beam 30. In one embodiment, the emitted light beam 30 is a coherent light beam such as a laser beam. The laser beam may have a wavelength range of approximately 300 to 1600 nanometers, for example 790 nanometers, 905 nanometers, 1550 nm, or less than 400 nanometers. It should be appreciated that other electromagnetic radiation beams having greater or smaller wavelengths may also be used. The emitted light beam 30 is amplitude or intensity modulated, for example, with a sinusoidal waveform or with a rectangular waveform. The emitted light beam 30 is emitted by the light emitter 28 onto a beam steering unit, such as mirror 26, where it is deflected to the environment. A reflected light beam 32 is reflected from the environment by an object 34. The reflected or scattered light is intercepted by the rotary mirror 26 and directed into a light receiver 36. The directions of the emitted light beam 30 and the reflected light beam 32 result from the angular positions of the rotary mirror 26 and the measuring head 22 about the axes 25 and 23, respectively. These angular positions in turn depend on the corresponding rotary drives or motors.

Coupled to the light emitter 28 and the light receiver 36 is a controller 38. The controller 38 determines, for a multitude of measuring points X, a corresponding number of distances d between the laser scanner 20 and the points X on object 34. The distance to a particular point X is determined based at least in part on the speed of light in air through which electromagnetic radiation propagates from the device to the object point X. In one embodiment the phase shift of modulation in light emitted by the laser scanner 20 and the point X is determined and evaluated to obtain a measured distance d.

The speed of light in air depends on the properties of the air such as the air temperature, barometric pressure, relative humidity, and concentration of carbon dioxide. Such air properties influence the index of refraction n of the air. The speed of light in air is equal to the speed of light in vacuum c divided by the index of refraction. In other words, $c_{air}=c/n$. A laser scanner of the type discussed herein is based on the time-of-flight (TOF) of the light in the air (the round-trip time for the light to travel from the device to the object and back to the device). Examples of TOF scanners include scanners that measure round trip time using the time interval between emitted and returning pulses (pulsed TOF scanners), scanners that modulate light sinusoidally and measure phase shift of the returning light (phase-based scanners), as well as many other types. A method of measuring distance based on the time-of-flight of light depends on the speed of light in air and is therefore easily distinguished from methods of measuring distance based on triangulation. Triangulation-based methods involve projecting light from a light source along a particular direction and then intercepting the light on a camera pixel along a particular direction. By knowing the distance between the camera and the projector and by matching a projected angle with a received angle, the method of triangulation enables the distance to the object to be determined based on one known length and two known angles of a triangle. The method of triangulation, therefore, does not directly depend on the speed of light in air.

In one mode of operation, the scanning of the volume around the laser scanner 20 takes place by rotating the rotary mirror 26 relatively quickly about axis 25 while rotating the measuring head 22 relatively slowly about axis 23, thereby moving the assembly in a spiral pattern. In an exemplary embodiment, the rotary mirror rotates at a maximum speed of 5820 revolutions per minute. For such a scan, the gimbal point 27 defines the origin of the local stationary reference system. The base 24 rests in this local stationary reference system.

In addition to measuring a distance d from the gimbal point 27 to an object point X, the scanner 20 may also collect gray-scale information related to the received optical power (equivalent to the term "brightness.") The gray-scale value may be determined at least in part, for example, by integration of the bandpass-filtered and amplified signal in the light receiver 36 over a measuring period attributed to the object point X.

The measuring head 22 may include a display device 40 integrated into the laser scanner 20. The display device 40 may include a graphical touch screen 41, as shown in FIG. 1, which allows the operator to set the parameters or initiate the operation of the laser scanner 20. For example, the screen 41 may have a user interface that allows the operator to provide measurement instructions to the device, and the screen may also display measurement results.

The laser scanner 20 includes a carrying structure 42 that provides a frame for the measuring head 22 and a platform for attaching the components of the laser scanner 20. In one embodiment, the carrying structure 42 is made from a metal such as aluminum. The carrying structure 42 includes a traverse member 44 having a pair of walls 46, 48 on opposing ends. The walls 46, 48 are parallel to each other and extend in a direction opposite the base 24. Shells 50, 52 are coupled to the walls 46, 48 and cover the components of the laser scanner 20. In the exemplary embodiment, the shells 50, 52 are made from a plastic material, such as polycarbonate or polyethylene for example. The shells 50, 52 cooperate with the walls 46, 48 to form a housing for the laser scanner 20.

On an end of the shells 50, 52 opposite the walls 46, 48 a pair of yokes 54, 56 are arranged to partially cover the respective shells 50, 52. In the exemplary embodiment, the yokes 54, 56 are made from a suitably durable material, such as aluminum for example, that assists in protecting the shells 50, 52 during transport and operation. The yokes 54, 56 each includes a first arm portion 58 that is coupled, such as with a fastener for example, to the traverse 44 adjacent the base 24. The arm portion 58 for each yoke 54, 56 extends from the traverse 44 obliquely to an outer corner of the respective shell 50, 52. From the outer corner of the shell, the yokes 54, 56 extend along the side edge of the shell to an opposite outer corner of the shell. Each yoke 54, 56 further includes a second arm portion that extends obliquely to the walls 46, 48. It should be appreciated that the yokes 54, 56 may be coupled to the traverse 42, the walls 46, 48 and the shells 50, 54 at multiple locations.

The pair of yokes 54, 56 cooperate to circumscribe a convex space within which the two shells 50, 52 are arranged. In the exemplary embodiment, the yokes 54, 56 cooperate to cover all of the outer edges of the shells 50, 54, while the top and bottom arm portions project over at least a portion of the top and bottom edges of the shells 50, 52. This provides advantages in protecting the shells 50, 52 and the measuring head 22 from damage during transportation and operation. In other embodiments, the yokes 54, 56 may include additional features, such as handles to facilitate the carrying of the laser scanner 20 or attachment points for accessories for example.

On top of the traverse 44, a prism 60 is provided. The prism extends parallel to the walls 46, 48. In the exemplary embodiment, the prism 60 is integrally formed as part of the carrying structure 42. In other embodiments, the prism 60 is a separate component that is coupled to the traverse 44. When the mirror 26 rotates, during each rotation the mirror 26 directs the emitted light beam 30 onto the traverse 44 and the prism 60. Due to non-linearities in the electronic components, for example in the light receiver 36, the measured distances d may depend on signal strength, which may be measured in optical power entering the scanner or optical power entering optical detectors within the light receiver 36, for example. In an embodiment, a distance correction is stored in the scanner as a function (possibly a nonlinear function) of distance to a measured point and optical power (generally unscaled quantity of light power sometimes referred to as "brightness") returned from the measured point and sent to an optical detector in the light receiver 36. Since the prism 60 is at a known distance from the gimbal point 27, the measured optical power level of light reflected by the prism 60 may be used to correct distance measurements for other measured points, thereby allowing for compensation to correct for the effects of environmental variables such as temperature. In the exemplary embodiment, the resulting correction of distance is performed by the controller 38.

In an embodiment, the base 24 is coupled to a swivel assembly (not shown) such as that described in commonly owned U.S. Pat. No. 8,705,012 ('012), which is incorporated by reference herein. The swivel assembly is housed within the carrying structure 42 and includes a motor 138 that is configured to rotate the measuring head 22 about the axis 23. In an embodiment, the angular/rotational position of the measuring head 22 about the axis 23 is measured by angular encoder 134.

An auxiliary image acquisition device 66 may be a device that captures and measures a parameter associated with the scanned area or the scanned object and provides a signal representing the measured quantities over an image acquisition area. The auxiliary image acquisition device 66 may be, but is not limited to, a pyrometer, a thermal imager, an ionizing radiation detector, or a millimeter-wave detector. In an embodiment, the auxiliary image acquisition device 66 is a color camera.

In an embodiment, a central color camera (first image acquisition device) 112 is located internally to the scanner and may have the same optical axis as the 3D scanner device. In this embodiment, the first image acquisition device 112 is integrated into the measuring head 22 and arranged to acquire images along the same optical pathway as emitted light beam 30 and reflected light beam 32. In this embodiment, the light from the light emitter 28 reflects off a fixed mirror 116 and travels to dichroic beam-splitter 118 that reflects the light 117 from the light emitter 28 onto the rotary mirror 26. In an embodiment, the mirror 26 is rotated by a motor 136 and the angular/rotational position of the mirror is measured by angular encoder 134. The dichroic beam-splitter 118 allows light to pass through at wavelengths different than the wavelength of light 117. For example, the light emitter 28 may be a near infrared laser light (for example, light at wavelengths of 780 nm or 1150 nm), with the dichroic beam-splitter 118 configured to reflect the infrared laser light while allowing visible light (e.g., wavelengths of 400 to 700 nm) to transmit through. In other embodiments, the determination of whether the light passes through the beam-splitter 118 or is reflected depends on the polarization of the light. The digital camera 112 obtains 2D images of the scanned area to capture color data to add to the scanned image. In the case of a built-in color camera having an optical axis coincident with that of the 3D scanning device, the direction of the camera view may be easily obtained by simply adjusting the steering mechanisms of the scanner—for example, by adjusting the azimuth angle about the axis 23 and by steering the mirror 26 about the axis 25.

In the exemplary embodiment, a panoramic camera 126 is coupled to the housing of the 3D scanning device 20. The panoramic camera 126 includes a lens 128 and an optical sensor or optical array 130. As discussed in more detail herein, the lens and optical sensor 130 cooperate to define a field of view of the panoramic camera 126. The panoramic camera 126 is operable to acquire 2D images within the field of view. In the exemplary embodiment, the images acquired by the panoramic camera 126 lack depth information Referring now to FIG. 4 with continuing reference to FIGS. 1-3, elements are shown of the laser scanner 20. Controller 120 is a suitable electronic device capable of accepting data and instructions, executing the instructions to process the data, and presenting the results. The controller 120 includes one or more processing elements 122. The processors may be microprocessors, field programmable gate arrays (FPGAs), digital signal processors (DSPs), and generally any device capable of performing computing functions. The one or more processors 122 have access to memory 124 for storing information.

Figure 4:
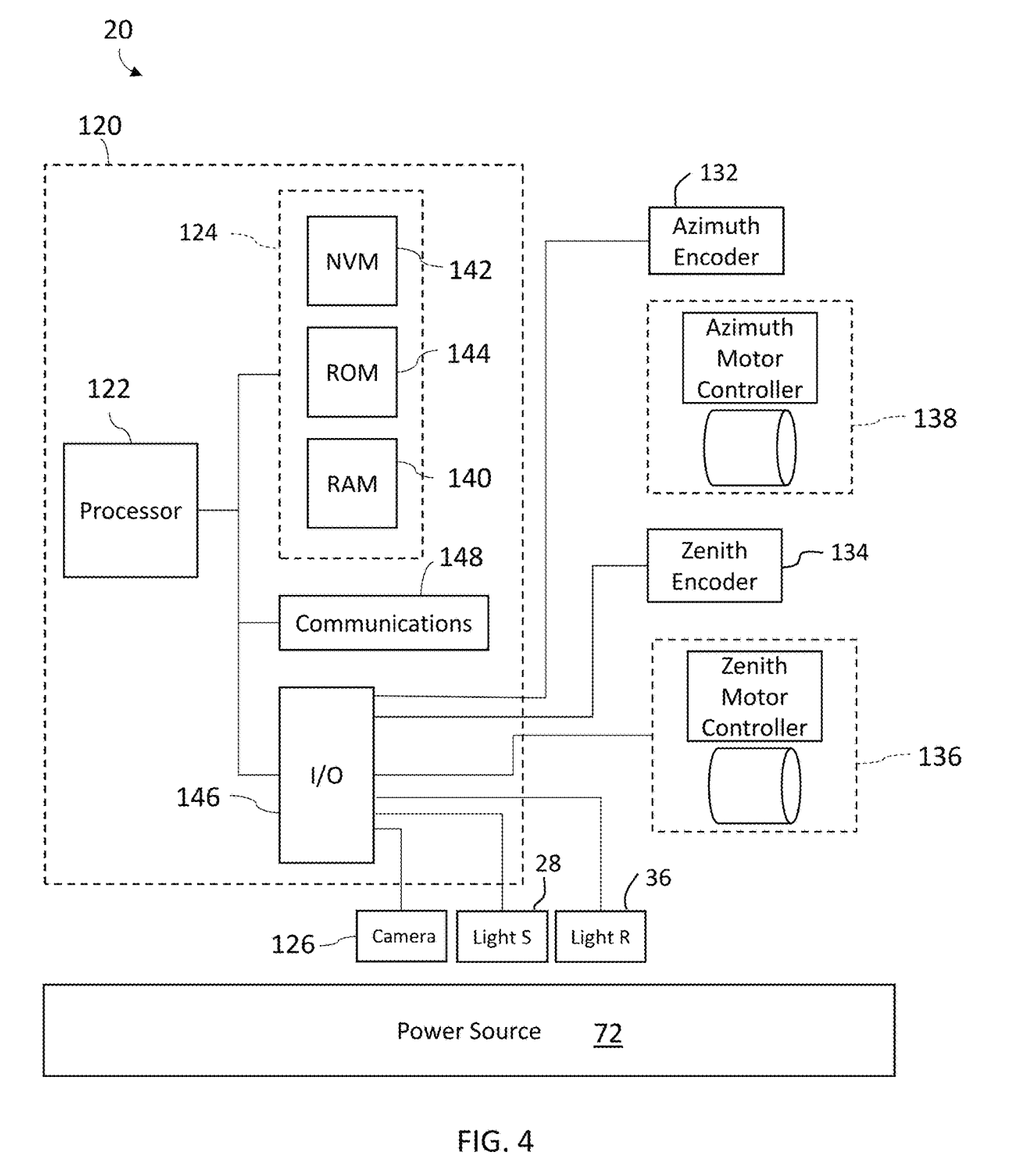
FIG. 4 illustrates a schematic illustration of the laser scanner of FIG. 1 according to an embodiment.

Controller 120 is capable of converting the analog voltage or current level provided by light receiver 36 into a digital signal to determine a distance from the laser scanner 20 to an object in the environment. Controller 120 uses the digital signals that act as input to various processes for controlling the laser scanner 20. The digital signals represent one or more laser scanner 20 data including but not limited to distance to an object, images of the environment, images acquired by panoramic camera 126, angular/rotational measurements by a first or azimuth encoder 132, and angular/rotational measurements by a second axis or zenith encoder 134.

In general, controller 68 accepts data from encoders 132, 134, light receiver 36, light source 28, and panoramic camera 126 and is given certain instructions for the purpose of generating a 3D point cloud of a scanned environment. Controller 68 provides operating signals to the light source 28, light receiver 36, panoramic camera 126, zenith motor 136 and azimuth motor 138. The controller 68 compares the operational parameters to predetermined variances and if the predetermined variance is exceeded, generates a signal that alerts an operator to a condition. The data received by the controller 68 may be displayed on a user interface 40 coupled to controller 120. The user interface 140 may be one or more LEDs (light-emitting diodes) 82, an LCD (liquid-crystal diode) display, a CRT (cathode ray tube) display, a touch-screen display or the like. A keypad may also be coupled to the user interface for providing data input to controller 120. In one embodiment, the user interface is arranged or executed on a mobile computing device that is coupled for communication, such as via a wired or wireless communications medium (e.g. Ethernet, serial, USB, Bluetooth™ or WiFi) for example, to the laser scanner 20.

The controller 68 may also be coupled to external computer networks such as a local area network (LAN) and the Internet. A LAN interconnects one or more remote computers, which are configured to communicate with controller 68 using a well-known computer communications protocol such as TCP/IP (Transmission Control Protocol/Internet(ˆ) Protocol), RS-232, ModBus, and the like. Additional systems 20 may also be connected to LAN with the controllers 120 in each of these systems 20 being configured to send and receive data to and from remote computers and other systems 20. The LAN may be connected to the Internet. This connection allows controller 120 to communicate with one or more remote computers connected to the Internet.

The processors 122 are coupled to memory 124. The memory 124 may include random access memory (RAM) device 140, a non-volatile memory (NVM) device 142, and a read-only memory (ROM) device 144. In addition, the processors 122 may be connected to one or more input/output (I/O) controllers 146 and a communications circuit 148. In an embodiment, the communications circuit 92 provides an interface that allows wireless or wired communication with one or more external devices or networks, such as the LAN discussed above.

Figure 12:
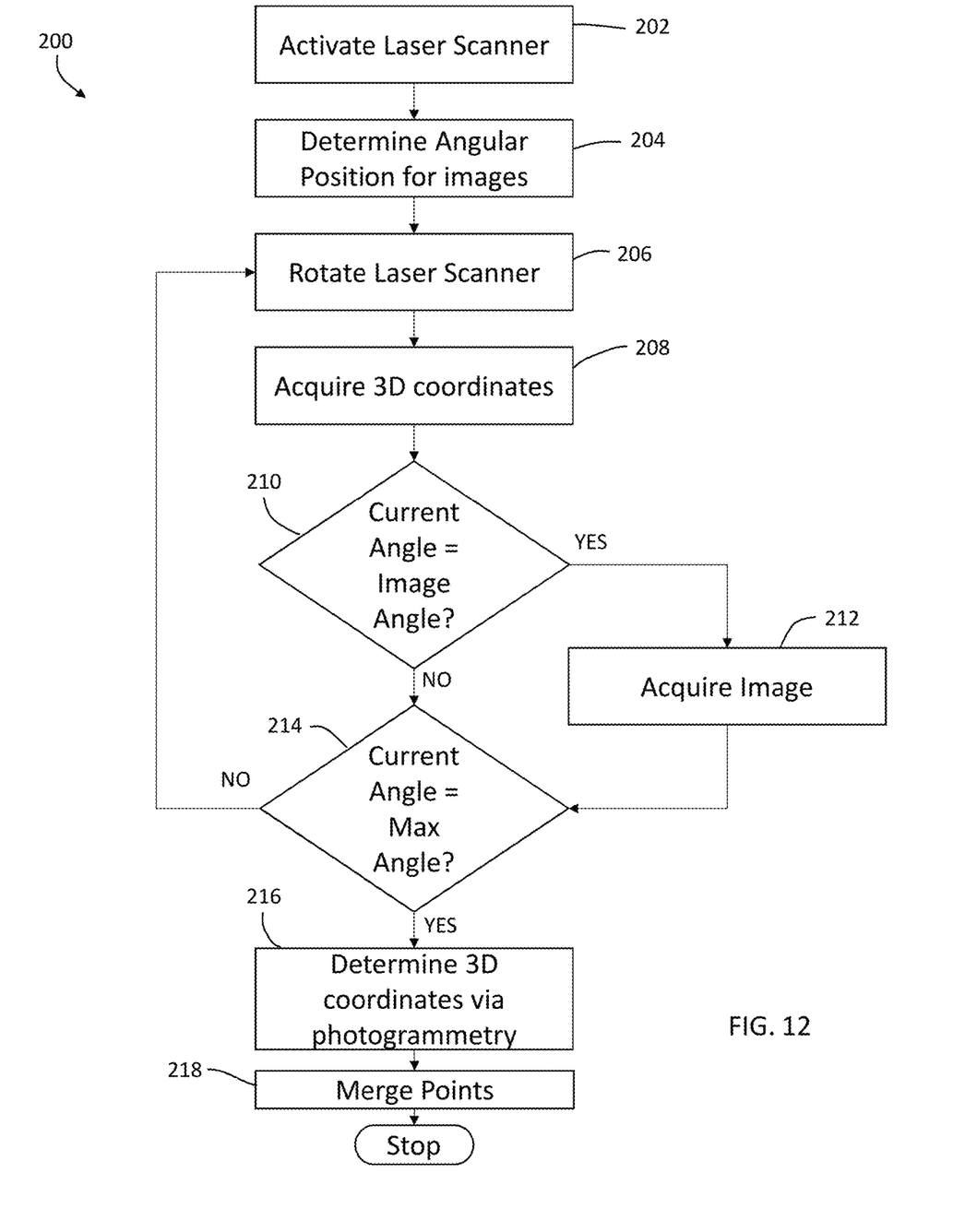
FIG. 12 is a flow diagram of a method of operating the laser scanner of FIG. 1 according to an embodiment.

Controller 120 includes operation control methods embodied in application code shown in FIG. 12. These methods are embodied in computer instructions written to be executed by processors 122, typically in the form of software. The software can be encoded in any language, including, but not limited to, assembly language, VHDL (Verilog Hardware Description Language), VHSIC HDL (Very High Speed IC Hardware Description Language), Fortran (formula translation), C, C++, C #, Objective-C, Visual C++, Java, ALGOL (algorithmic language), BASIC (beginners all-purpose symbolic instruction code), visual BASIC, ActiveX, HTML (HyperText Markup Language), Python, Ruby and any combination or derivative of at least one of the foregoing.

Figure 5:
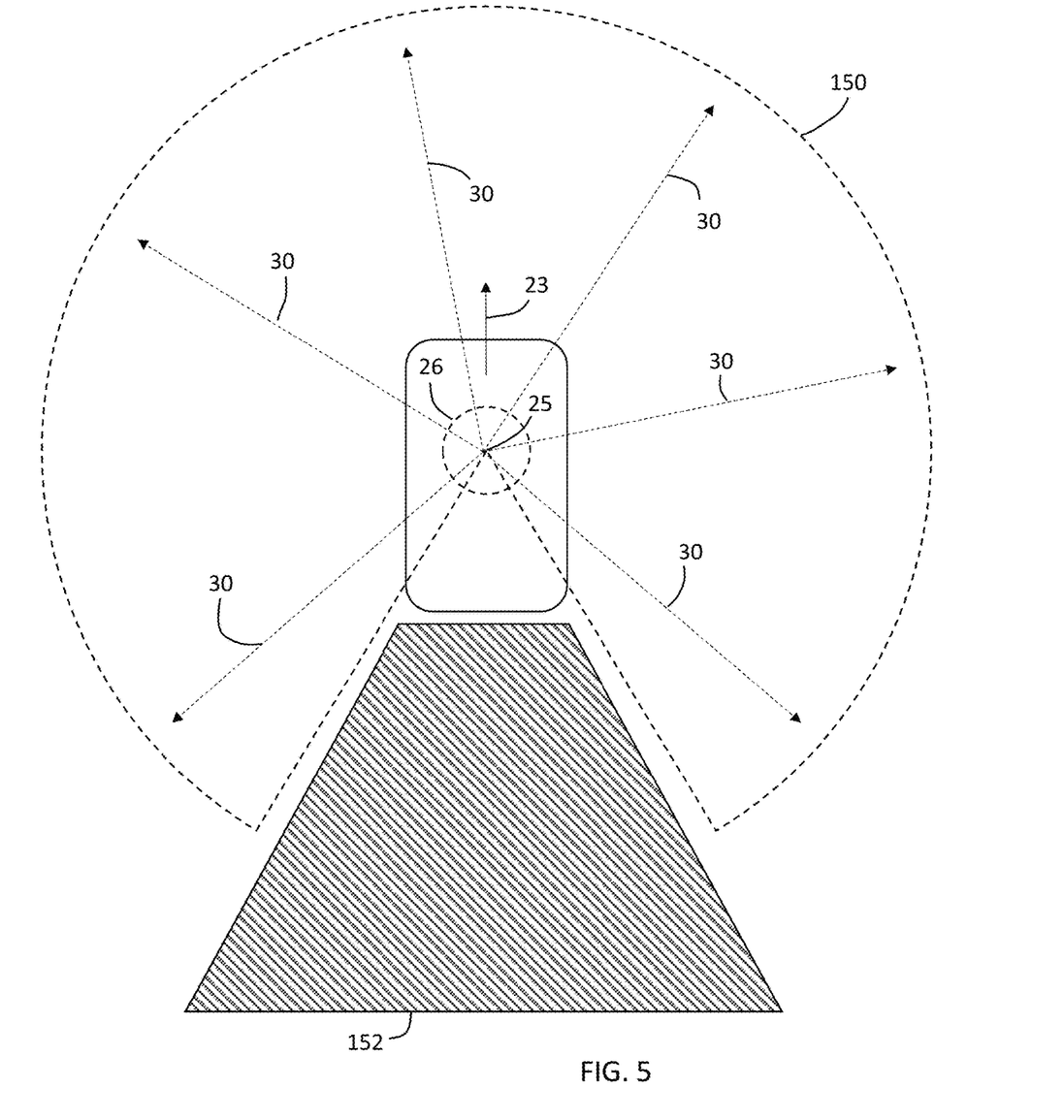
FIG. 5 is a schematic illustration of the scan area and a shadow area.

Referring now to FIG. 5, with continuing reference to FIGS. 1-4, the scanning operation of the laser scanner 20 is shown. During operation, the mirror 26 rotates at a rapid rate. As light is emitted from the light source 28, the light 30 is emitted radially outward from the mirror 26. When the laser scanner 20 is not rotating about the azimuth axis 23, the light 30 covers a cylindrical scanning area 150. When the laser scanner 20 is rotating about the azimuth axis 23, the light beams 30 are emitted in a spiral pattern to define a scanning area in a spherical direction about the laser scanner 20 with the origin being at the intersection of the azimuth axis 23 and the zenith axis 25.

As discussed herein, in an embodiment the laser scanner 20 includes a traverse member 44 (FIG. 1) that supports a prism 60. It should be appreciated that traverse member 44 blocks light 30 from being emitted in the direction through the traverse member 44. As a result, a shadow area 152 is formed in the area blocked by the traverse member 44 and no 3D coordinates may be determined within this area using the light source 28 and light receiver 36. When the laser scanner 20 is in an upright position, with the zenith axis 25 being parallel with the floor, the shadow area 152 is a cylindrical area on the floor beneath the laser scanner 20. In an embodiment, the shadow area 152 centered on the azimuth axis 23.

Figure 6:
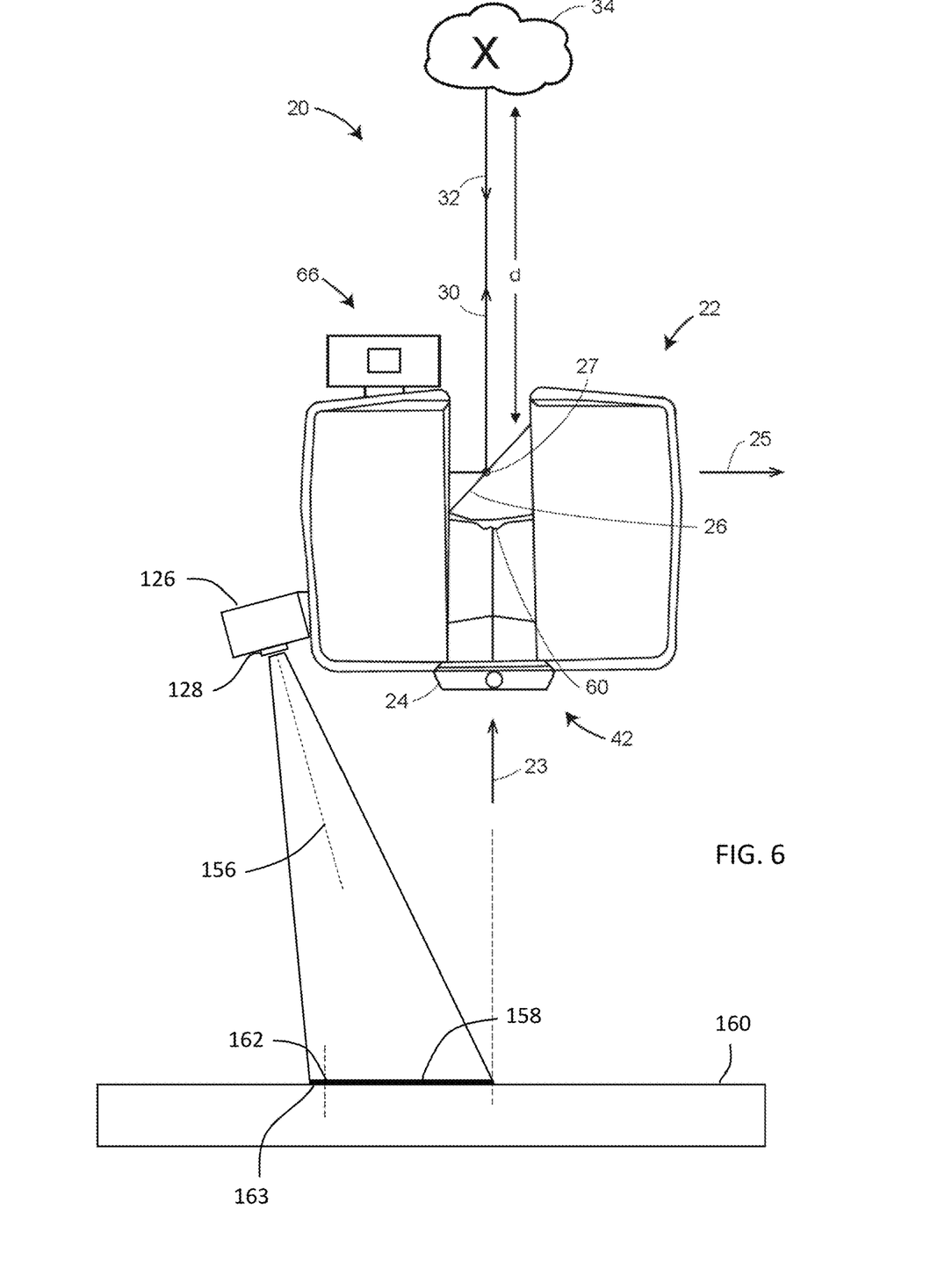
FIG. 6 is a side view of the laser scanner of FIG. 1 with the photogrammetry camera acquiring an image according to an embodiment.
Figure 7:
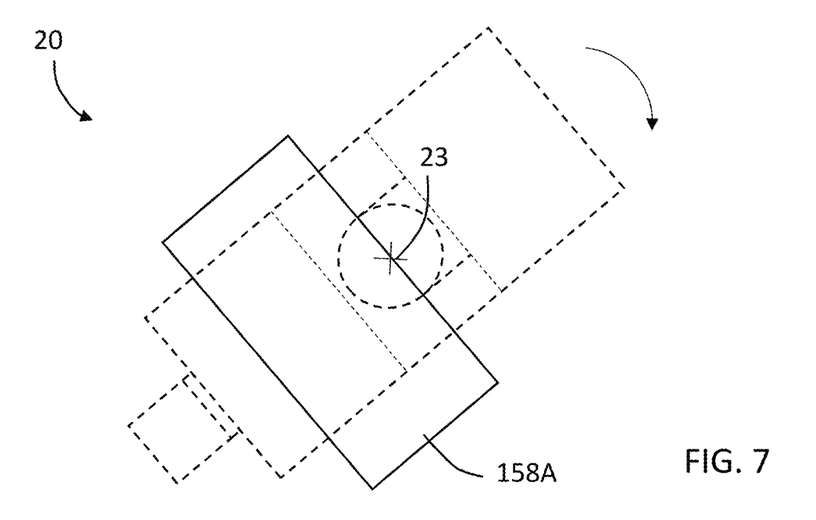
FIGS. 7-10 are schematic illustrations of the acquisition of photogrammetry images as the laser scanner is rotating about the vertical axis according to an embodiment.
Figure 8:
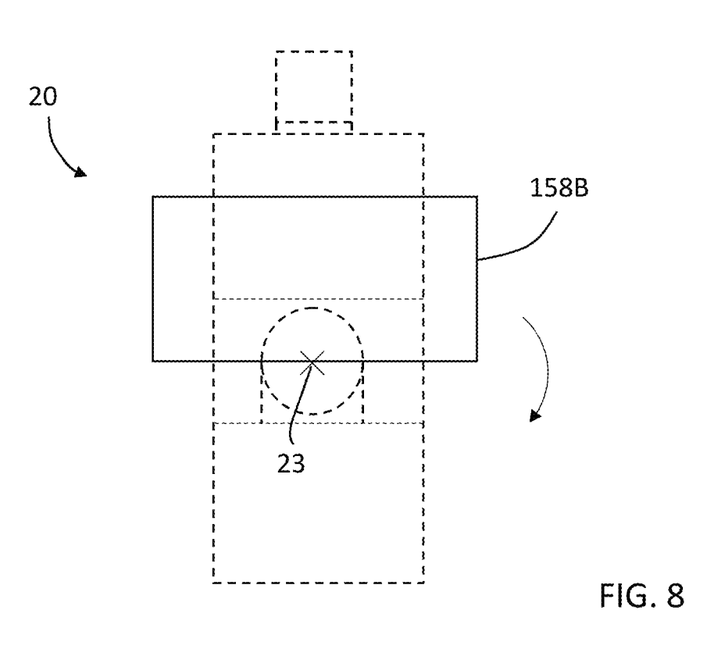
Figure 9:
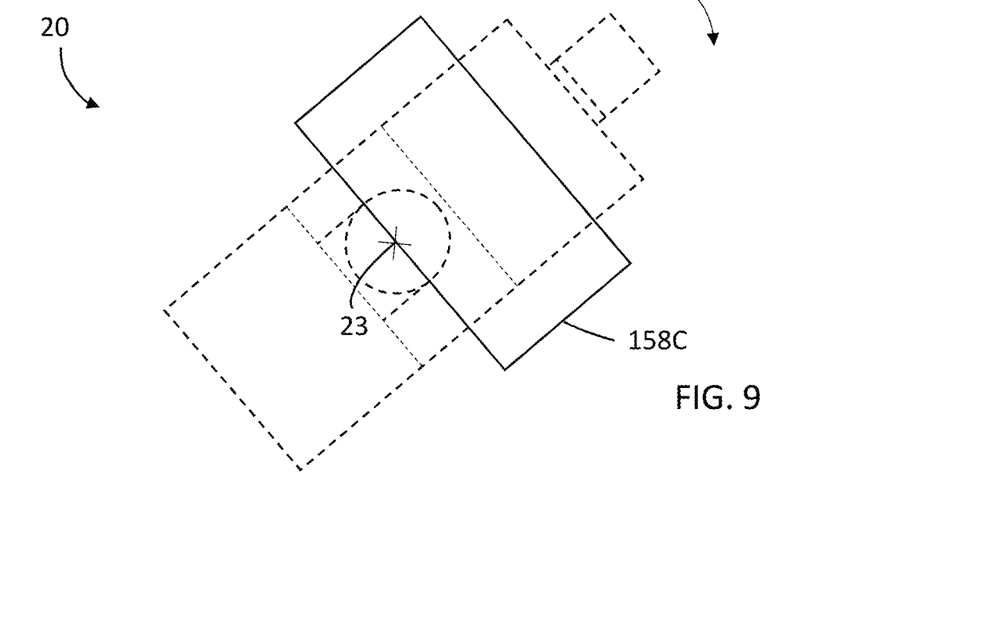

Referring now to FIG. 6, an embodiment of the laser scanner 20 is shown having the photogrammetry camera 126 coupled to a side or an end of the shell 50, 52 or the yoke 54, 56 for example. In this embodiment, the photogrammetry camera 126 is offset from the azimuth axis 23 and has a lens 128 disposed on an angle relative to the azimuth axis 30 and zenith axis 25 such that the optical axis 156 is directed into an area below the traverse member 44. In an embodiment, the angle of the optical axis and the size the field of view 158 are selected such that a portion of the field of view 158 includes a point where the azimuth axis 23 intersects the plane 160 (e.g. the floor) upon which the field of view is located. In an embodiment, the field of view is further selected to extend beyond (e.g. radially outward from the azimuth axis 23) the edge (represented by the dashed line 162) of the shadow area 152. This provides advantages in allowing the photogrammetry camera 126 to acquire images of the shadow area 152 such that when multiple images are acquired, the images overlap and cover the shadow area 152. It should be appreciated that in other embodiments, the field of view 158 may be smaller than the shadow area 152.

In the exemplary embodiment, the field of view 158 includes an area 163 that overlaps with the scan area 150. This allows for the determination of scale of the photogrammetry images based on the 3D coordinates within the overlap area 163 measured by the laser scanner 20 and the photogrammetry camera 126. In other embodiments, the scale may be determined from the angular distance (as measured by the laser scanner encoder for axis 23) between the positions where the photogrammetry images are acquired. In still another embodiment a second photogrammetry camera (not shown) located at a predetermined baseline distance from the photogrammetry camera 126 is mounted to the side or an end of the shell 50, 52 or the yoke 54, 56 (e.g. on an opposite side from the camera 126). The scale may then be determined based on the baseline distance.

In one embodiment, the overlap area 163 may further be used to color balance the images acquired by the camera 126 with those acquired by the device 66 or central color camera 112.

In an embodiment, as the laser scanner 20 is rotated about the azimuth axis 23, the controller 120 will cause the photogrammetry camera 126 to acquire images of the field of view 158 on a periodic or aperiodic basis. In an embodiment, the angular position where the images are acquired is selected to provide sufficient overlap between adjacent images to allow the determination of 3D coordinates of a collection of points within the shadow area 152 using photogrammetry techniques. In an embodiment, the determination of the 3D coordinates of the collection of points is based on the angular position of each acquired image and natural features within the shadow area 152. In an embodiment, the laser scanner 20 is mounted on a tripod (not shown), having legs that extend to the surface 160. In an embodiment, each of the feet of the tripod are in at least two images acquired by the photogrammetry camera 126.

Figure 10:
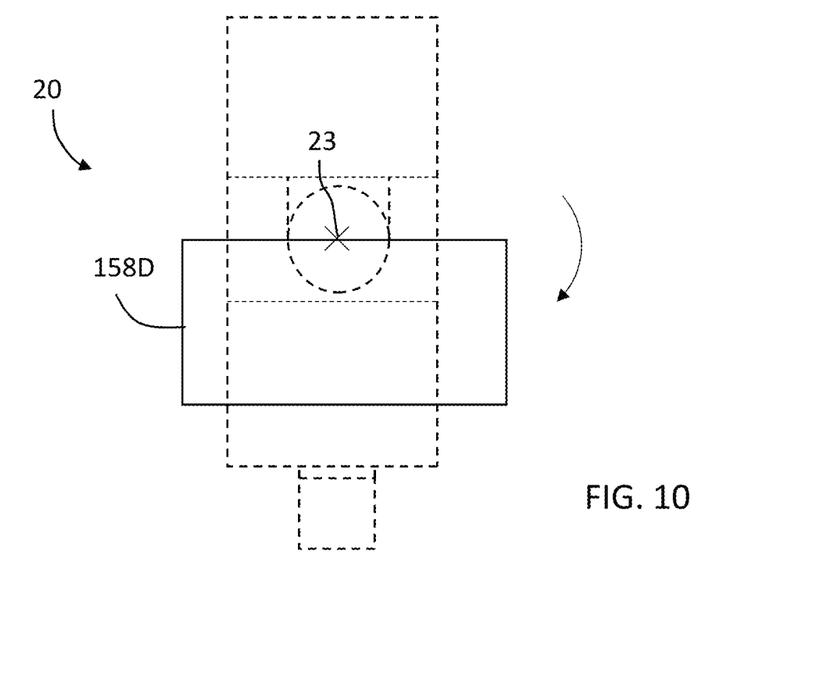
Figure 11:
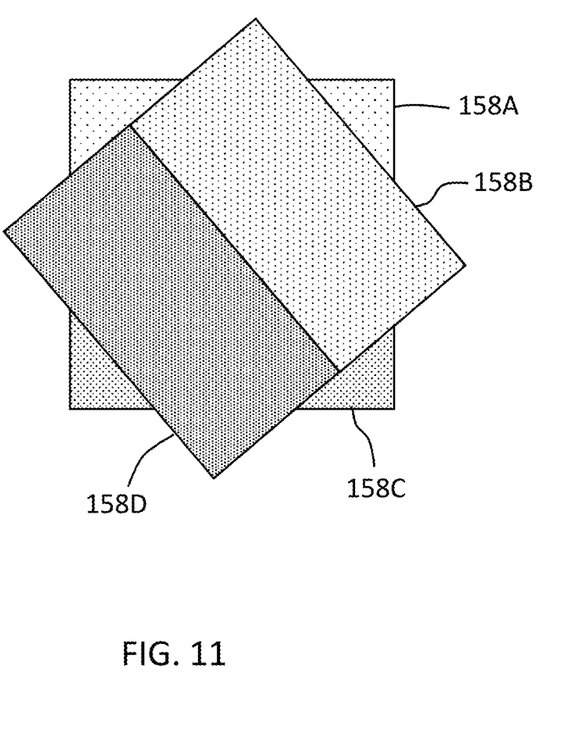
FIG. 11 is a schematic illustration of the overlap between the images acquired during the rotation of the laser scanner according to an embodiment.

Referring now to FIGS. 7-10 a sequence of images within the field of view 158A-158D are show as being acquired as the laser scanner 20 rotates about the azimuth axis 23. In this example, the images are acquired every 45 degrees as the laser scanner rotates. It should be appreciated that this is for exemplary purposes and the images 158A-158D may be acquired at other angles. As shown in FIG. 10, the images 15A-158D overlap, such that photogrammetry techniques may be used to determine 3D coordinates for a collection of points within the area covered by the images 158A-158D.

Referring now to FIG. 12, a method 200 is shown for determining 3D coordinates in both the scan area 150 and the shadow area 152. The method 200 begins in block 202 where the laser scanner 20 is activated. The method 200 then proceeds to block 204 where the number of images and the angular positions for the acquisition of the images is determined. In an embodiment, the number of images acquired and the angular positions are based at least in part on the height of the laser scanner 20 from the floor. This height may be measured by the operator and input into the laser scanner, such as via user interface 40 for example.

The method 200 then proceeds to block 206 where the mirror 26 is rotated about the zenith axis 25 and the laser scanner 20 is rotated about the azimuth axis 23. In block 208, the light source 28 starts to emit light beams 30 and the light receiver 36 receives reflected light 32. Based at least in part on the time of flight for the emitted light to return as reflected light and the angular positions of the mirror and laser scanner 20 about the zenith and azimuth axis 23, 25, the 3D coordinates of a first collection of points in the scan area 150 may be determined. The method 200 then proceeds to query block 210 where it is determined if the current angular/rotational position of the laser scanner 20 is equal to an angle where it is desired to acquire an image (as determined in block 204) with the photogrammetry camera 126.

When the query block 210 returns a positive, the method 200 proceeds to block 212 where an image is acquired. When the query block 210 returns a negative, or after the acquisition of an image in block 212, the method 200 then proceeds to query block 214 where it is determined if the current angle is equal to a maximum angle. In other words, has the laser scanner 20 rotated about the azimuth axis 23 to the angle where all of the desired images have been acquired. When the query block 214 returns a negative, the method 200 loops back to block 206 and the acquisition of 3D coordinates of points in the scan area continues.

When the query block 214 returns a positive, the method 200 proceeds to block 216 where 3D coordinates of a second collection of points located in the shadow area 152 are determined based at least in part from the images acquired by the photogrammetric camera 126 and the angular positions where the images were taken. The determination of the 3D coordinates being based on photogrammetric techniques.

In an embodiment, once the 3D coordinates for the first collection of points and the second collection of points are determined, the 3D coordinates are merged together to define a point cloud in block 218.

It should be appreciated that in an embodiment, the acquisition of photogrammetric images in blocks 210, 212, 214 may occur concurrently with the acquisition of 3D coordinates (block 208). In other embodiments, the acquisition of the 3D coordinates by the laser scanner 20 in the scan area may be performed during a first rotation of the laser scanner 20 about the axis 23 and the 3D coordinates in the shadow area may be acquired during a separate second rotation of the laser scanner 20 about the axis 23.

Terms such as processor, controller, computer, DSP, FPGA are understood in this document to mean a computing device that may be located within an instrument, distributed in multiple elements throughout an instrument, or placed external to an instrument.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A three-dimensional (3D) measuring device comprising:
    a processor system including at least one of a 3D scanner controller;
    a housing;
    a 3D scanner disposed within the housing and operably coupled to the processor system, the 3D scanner having a light source, a beam steering unit, a first angle measuring device, a second angle measuring device, and a light receiver, the beam steering unit cooperating with the light source and light receiver to define a scan area, the light source and the light receiver configured to cooperate with the processor system to determine a first distance to a first object point based at least in part on a transmitting of a light by the light source and a receiving of a reflected light by the light receiver, the 3D scanner configured to cooperate with the processor system to determine 3D coordinates of the first object point based at least in part on the first distance, a first angle of rotation and a second angle of rotation; and
    a photogrammetry camera operably coupled to the housing, the photogrammetry camera having a lens and an image sensor that define a field of view, the photogrammetry camera being oriented to position the field of view at least partially in a shadow area, the shadow area being outside of the scan area.

2. The device of claim 1, wherein the field of view of the photogrammetric camera is further at least partially in the scan area.

3. The device of claim 1, wherein the processor system is responsive to executable nontransitory computer instructions which when executed by the processor system is operable to:
    cause the 3D scanner to rotate the housing about a first axis and the beam steering unit to rotate about a second axis, the second axis being perpendicular to the first axis;
    cause the 3D scanner to cooperate with the processor system to determine 3D coordinates of a collection of points on the object surface while the 3D scanner is rotated;
    cause the photogrammetry camera to acquire at least two images of the shadow area while the 3D scanner is rotated; and
    determining with the processor system at least one 3D coordinate based at least in part on the two images.

4. The device of claim 3, wherein the first angle measuring device measures a first angle about the first axis and the second angle measuring device measures a second angle about the second axis.

5. The device of claim 4, wherein the determining of the at least one 3D coordinate is further based at least in part on the first angle and the second angle.

6. The device of claim 3, wherein the processor system is responsive to executable nontransitory computer instructions which when executed by the processor system is operable to combine the at least one 3D coordinate with the 3D coordinates of the first object point to define a point cloud.

7. The device of claim 3, wherein the photogrammetry camera is offset from the first axis.

8. The device of claim 3, wherein the beam steering unit includes a mirror configured to rotate about the second axis and a carriage that holds the mirror configured to rotate about the first axis, the rotation about the second axis being driven by a second motor and the rotation about the first axis being driven by a first motor.

9. A method for measuring and registering three-dimensional (3D) coordinates comprising:
    rotating a 3D scanner about a first axis, the 3D scanner having a light source, a light receiver and a photogrammetry camera;
    emitting a plurality of light beams from the light source and receiving with the light receiver a plurality of reflected light beams from an object surface within a scan area, the direction of each of the plurality of light beams being determined by a beam steering unit;
    determining, with a processor system, 3D coordinates of a first collection of points on the object surface within a scan area based at least in part on the plurality of light beams and the plurality of reflected light beams;
    acquiring at least two images of within the field of view of the photogrammetry camera as the 3D scanner is rotated about the first axis, the field of view of each of the photogrammetry camera being at least partially within a shadow area, the shadow area being outside of the scan area;
    determining, with the processor system, 3D coordinates of a second collection of points on the object surface based at least in part on the at least two images;
    merging the 3D coordinates of the first collection of points and the 3D coordinates of the second collection of points to define a point cloud; and
    storing the point cloud.

10. The method of claim 9, wherein the field of view of the photogrammetry camera being further at least partly within the scan area.

11. The method of claim 9, wherein the step of rotating the 3D scanner includes rotating the 3D scanner about the first axis and the beam steering unit about a second axis, the second axis being perpendicular to the first axis.

12. The method of claim 11, further comprising measuring rotation about the first axis with a first angle measuring device and measuring rotation of the beam steering unit with a second angle measuring device.

13. The method of claim 12, wherein the 3D coordinates of the first collection of points is further based at least in part on a measurement by the first angle measuring device and a measurement by the second angle measuring device.

14. The method of claim 12, wherein the determining of the 3D coordinates of the second collection of points is further based at least in part on a first measurement by the first angle measuring device when a first image of the at least two images is acquired and a second measurement by the first angle measuring device when a second image of the at least two images is acquired.

15. The method of claim 12, wherein the photogrammetry camera is offset from the first axis.

16. A three-dimensional measuring system comprising:
a housing that is rotatable about a first axis;
a light source disposed within the housing and operable to emit light beams;
a beam steering unit coupled to the housing and disposed to direct the emitted light beams onto an object surface within a scan area in the environment;
a light receiver disposed within the housing to receive light reflected from the object surface through the beam steering unit;
a photogrammetry camera operably coupled to the housing, the photogrammetry camera having a lens and an image sensor that define a field of view, the photogrammetry camera being oriented to acquire an image within the field of view that is at least partially within a shadow area and at least partially within the scan area, the shadow area being separate from the scan area; and
a processor system operably coupled to the light source, the beam steering unit, the light receiver and the photogrammetry camera, the processor system being responsive to nontransitory executable computer instructions to determine 3D coordinates of a first collection of points on the object surface based at least in part on the emitting of the light beams and the receiving by the light receiver of the reflected light, and to determine 3D coordinates of a second collection of points in the shadow area based on at least two images acquired by the photogrammetry camera.

17. The system of claim 16, wherein the processor system is responsive to executable nontransitory computer instructions which when executed by the processor system is operable to:
cause the housing to rotate about a first axis and the beam steering unit to rotate about a second axis, the second axis being perpendicular to the first axis;
cause photogrammetry camera to acquire a first image of the at least two images at a first rotational position about the first axis and the second image of the at least two image at a second rotational position about the first axis; and
determine the 3D coordinates of the second collection of points based at least in part on the first rotational position and the second rotational position.

18. The system of claim 17, wherein the processor system is responsive to executable nontransitory computer instructions which when executed by the processor system is operable to combine the 3D coordinates of the first collection of points and the 3D coordinates of the second collection of points to define a point cloud.

19. The system of claim 16, wherein the photogrammetry camera is offset from the first axis.

20. The system of claim 16, wherein the beam steering unit includes a mirror operable to rotate about a second axis, the second axis being perpendicular to the first axis, the mirror being disposed to reflect the emitted light beams and the reflected light beams.

21. The system of claim 20, further comprising:
a first motor coupled to rotate the housing about the first axis; and
a second motor coupled to rotate the mirror about the second axis.

22. The system of claim 21, further comprising:
a first angle measuring device operably coupled to measure the rotational position of the housing about the first axis;
a second angle measuring device operably coupled to measure the rotational position of the mirror about the second axis; and
wherein the 3D coordinates of the first collection of points are based at least in part on measurements by the first angle measuring device and the second angle measuring device.

* * * * *